(No Model.)

G. W. WILLS.
SAW.

No. 293,130. Patented Feb. 5, 1884.

Attest.  
M. S. Newbury  
A. E. Bredell

Inventor.  
George Washington Wills

UNITED STATES PATENT OFFICE.

GEORGE WASHINGTON WILLS, OF PORTLAND, OREGON.

SAW.

SPECIFICATION forming part of Letters Patent No. 293,130, dated February 5, 1884.

Application filed January 29, 1883. (No model.)

*To all whom it may concern:*

Be it known that I, GEORGE W. WILLS, a resident of Portland, in the county of Multnomah and State of Oregon, have invented certain new and useful Improvements in Crosscut-Saws; and I do hereby declare that the following is a full, clear, and exact description of the same, which will enable those skilled in the art to which it appertains to make and use the same, reference being had to the accompanying drawings, which form a part of the specification, and in which—

Figure 1:
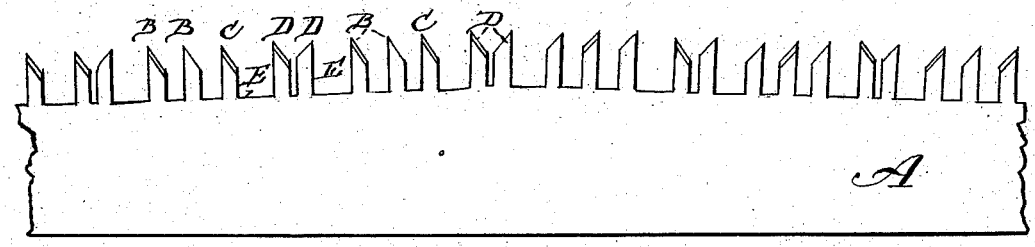
Figure 2:
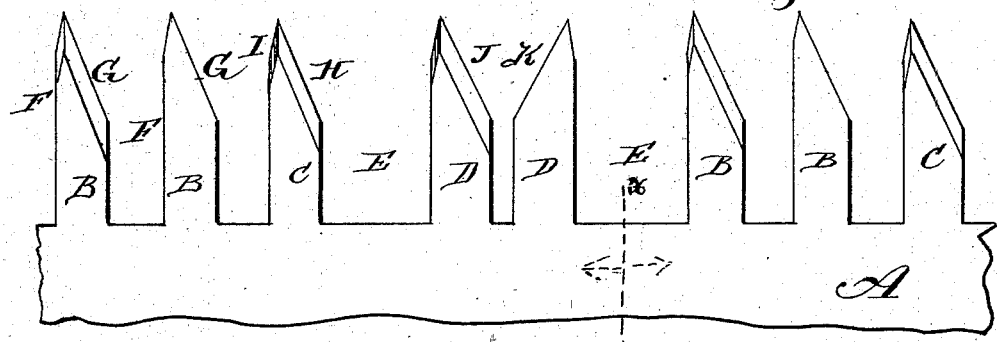
Figure 3:
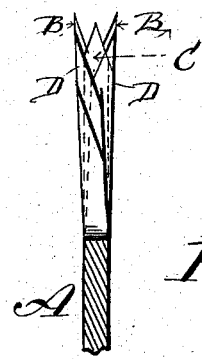
Figure 4:
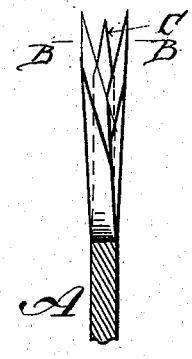

Figure 1 is a side view of the entire saw. Fig. 2 is a similar view of a portion of the same on an enlarged scale; and Figs. 3 and 4 are cross-sections on line $x\,x$, Fig. 2, looking in opposite directions.

Similar letters of reference indicate corresponding parts in all the figures.

My invention has relation to that class of crosscut-saws in which the teeth are arranged in groups, each group of cutter-teeth having a clearer-tooth; and it consists in the improved construction and combination of parts of such a saw in which the teeth have no set, but are filed in such a manner as to clear themselves, as hereinafter more fully described and claimed.

In the accompanying drawings, the letter A indicates the saw-blade, which is of the usual shape, and the lower edge of which is provided with the teeth, which are arranged in groups of two different characters, one of which contains two cutter-teeth, B, and one clearer-tooth, C, while the other kind of group consists of two drag-teeth, D, a space, E, being left between each group, and the said groups alternating. The lower edge of the saw is preferably curved, having the widest bulge at the center, and the teeth are arranged so as to make the teeth of each half cut out from the center of the saw, as in the usual construction of crosscut-saws having a curved lower edge; but I will, for the sake of convenience, call the edges of the teeth facing outward from the middle the "forward" or "front" edge, and the edges facing toward the center the "rear" edges, only describing the teeth upon one half, the teeth upon the other half being of the same construction, only reversely arranged. The two cutter teeth have their forward straight edges beveled and sharpened to opposite sides, while their rear edges, which are beveled at the same sides as the forward edges, are cut off inclined at their upper portions, the forward edges being shown at F and the rear edges at G. The clearer-tooth has its rear edge cut off inclined in the same manner as the cutter-teeth, and beveled to both sides, as shown at H, and its forward edge, I, which is straight, is also beveled to both sides, thus bringing the point of the clearer-tooth, which is preferably somewhat shorter than the cutter-teeth, to stand between the points of the cutter-teeth, when looking from the end of the saw, as shown plainly in Figs. 3 and 4. In this manner the clearer-tooth will serve to draw the particles of wood cut loose by the cutter-teeth out of the kerf, clearing the same, as well as cutting the particles cut loose by the cutter-teeth, and being of the same length as the space between the points of the same in halves, thus making them easier for the drag-teeth to remove, which drag-teeth are placed two in a group, and have their facing edges cut off inclined, as shown at J and K, while the forward edge of the forward drag-tooth and the rear edge of the rear drag-tooth are straight, both the edges of each tooth being beveled and sharpened to the side opposite to beveled side of the other tooth. The upper edge of the saw being thinner than the lower edge, and the teeth being beveled and sharpened at opposite sides, placing the points at both sides of the kerf will obviate the necessity of setting the teeth, the latter cutting themselves free by their shape and by the shape of the saw-blade. It follows that both edges of the teeth being sharpened both edges will assist in cutting the wood; but it follows, also, that the forward edges being straight they will cut deeper and draw more of the particles cut loose out of the kerf than the inclined rear edges, which will glide more easily over the fibers of the wood, preparing the way for the forward edges when they are drawn outward.

I am aware that saws have been made having the cutter-teeth set out to the sides, and having the clearer-teeth without any set; and I do not wish to claim such construction, broadly; but

What I claim, and desire to secure by Letters Patent of the United States, is—

The combination of two cutter-teeth having their forward edges straight and their rear edges cut off inclined at their upper portions, and having the edges beveled and sharpened at opposite sides of the two teeth, a clearer-tooth having a straight forward edge and inclined rear edge, and having its edges beveled to both sides, and two drag-teeth having their facing edges cut off inclined and their outer edges straight, and having their edges beveled and sharpened upon opposite sides, said teeth being arranged in alternating groups, the two cutter-teeth in front of the clearer-tooth forming one group, and the drag-teeth forming another group, each group having an intermediate space, as and for the purpose shown and set forth.

GEORGE WASHINGTON WILLS.

In presence of—
NOAH RAMBERT,
A. E. BREDULL.